Patented Apr. 5, 1932

1,852,418

UNITED STATES PATENT OFFICE

CHARLES J. KOCH, OF KIRKWOOD, MISSOURI

PROCESS OF PREPARING HOP FLAVORED MALT EXTRACT IN POWDERED FORM

No Drawing. Application filed February 16, 1928. Serial No. 254,907.

This invention relates to dry hop flavored malt extract and to a process of producing the same; and the present application is a continuation in part of my application Serial No. 168,478, filed Feb. 15, 1927.

It has heretofore been proposed to manufacture hop flavored malt extract of syrupy or treacly form, and in such process, the malt extract is mixed with hops and then cooked in a vacuum pan for a relatively long time, with the result that a cooked and bitter taste is imparted to the mixture and the hop flavor is of inferior quality, and very slight at best.

The primary object of the present invention is the production of dry hop flavored malt extract in which the hop flavor is fully retained, and is of a pleasing, tonic quality.

In practicing the invention, I may first make malt extract in the usual manner to obtain a mixture containing about 12% of malt solids and 88% water. This extract mixture is boiled and during the boiling, hops are added and the mixture is boiled until the hop flavor is extracted to a desired degree from the hops and imparted to the malt extract. Then the mixture is strained to remove the hops, and finally, the hop flavored malt extract in liquid form is instantaneously dried at a relatively low temperature, that is, at a temperature considerably below the boiling point of water, so that a cooked taste is not imparted to the final product, and the hop flavor is retained in the latter when it is converted into dry powdered form.

One of the salient features of the present invention is the rapid instantaneous drying of the hop flavored malt extract at relatively low temperature without prolonged cooking, as this permits the final product to retain the natural, pleasant, tonic hop flavor.

In order to insure the proper hop flavor in the final product, it is advisable during the mixing of the hops and malt extract, to employ a larger amount of hops than is now used in producing such a mixture by long continued boiling, and I prefer to use about twice the amount of hops ordinarily used, and to add the hops to the boiling malt extract at intervals, i. e., in batches, so that the flavor will be thoroughly extracted to a desired degree of strength from the hops and imparted to the malt extract in a greatly increased amount, compared to the usual process. Consequently, when the mixture is dried, as described, even though some of the hop flavor is removed with the moisture, the remaining powdered extract will contain a sufficient quantity of the hop flavor to render the mixture palatable. The hop flavor impregnation will be stronger, and pleasanter to the taste than usual.

The process may be carried out in a number of ways, and the details may be varied to some extent, and the following is one example of the manner in which the process may be conducted. The grain may be malted in the usual manner, and ground into meal which is mixed with water. This mixture is then mashed say at about 100° F. for about thirty minutes, and afterwards mashed at say 115° F., for about fifteen minutes. Then the temperature is raised as quickly as possible by means of a steam coil or the like, to bring the same to about 170° F., and the mixture is kept at this temperature until it shows no traces of unconverted starch. Then the mixture is allowed to settle for about forty-five minutes without any heating or cooling of the same. The liquid is then drawn off down to the level of the settled meal, and the meal is then sparged at intervals to extract the remaining desirable constituents from the meal, and the resulting liquid is mixed with the liquid first drawn off. This liquid mixture will then contain about 12% extract according to the Balling saccharometer, that is, it will contain 12% solids and the remainder water.

This extract is boiled in an open kettle, and the hops are added at intervals during the boiling, and I prefer to use about twice the amount of hops ordinarily employed to make hop flavored malt extract. In the boiling and hop mixing part of the process, I may add one-fifth of the hops to the extract while the latter is boiling and after the kettle contains about one-fifth of the liquid extract, which is fed into the same. When the kettle has been completely filled with the liquid extract, and while the latter is boiling, I add one-third of the remaining hops and let the mixture boil for about fifteen minutes. Another third of the hops is then added and the mixture allowed to boil for about thirty minutes. I then add the remaining one-third of the hops and permit the mixture to boil for about five or fifteen minutes. At this time, the flavor will have been removed from the hops to the desired extent, and imparted to the malt extract, and I then strain the mixture to separate the hop flowers or leaves from the extract.

The resulting mixture is a liquid extract of malt of about 10 to 12 degrees Balling, highly flavored with hops, and this mixture is led into open settling vats.

After the mixture has cooled considerably below the boiling point of water, but while it is still in somewhat heated condition, say about 150° F., it is fed into a drier, in which the moisture is separated instantaneously from the solids, the latter being removed from the apparatus as a hop flavored malt extract in powdered form, in which the hop flavor is retained to the desired degree, some of the hop flavor having, of course, been removed with the moisture.

Any suitable form of drier or apparatus for desiccating liquids, may be employed in the drying part of my process, which will preserve the natural hop flavor. One form of such an apparatus is shown in the patent to Gray and Jensen, No. 1,078,848, November 18, 1913.

The extract, up to the time it is desiccated, is in a free liquid and non-syrupy condition, and does not assume a syrupy state during any stage of the process. This absence of syrup, which is invariably formed with the usual processes, is essential to the manufacture of the loose, dry powder product, characteristic of my invention, obtained by instantaneous evaporation, as described.

The product resulting from my process is hop flavored malt extract in powdered form, and it is very nutritious and can be used in foods, medicines or non-alcoholic beverages. It will be seen that the invention contemplates the employment of graduated heating effects, as applied to flavor impregnation, and in conjunction with graduated amounts of impregnation material; furthermore, the drying stage of the process, used to obtain the new product, is designed to obtain an unadultered flavoring powder without deterioration of the excellent quality of product arrived at by the new process of extraction.

From the foregoing, it is believed that the invention may be readily understood by those skilled in the art, and I am aware that changes may be made in the details disclosed, without departing from the spirit of the invention as expressed in the claims.

What I claim and desire to secure by Letters Patent is:

1. The process of making a hop-flavored malt extract in the form of a dry powder and being devoid of the cooked and bitter taste characterizing products obtained by the ordinary concentration of liquid hop-flavored malt extracts to the syrupy and solid condition which comprises spray-drying an extract of malt and hops.

2. The process of making a hop-flavored malt extract in the form of a dry powder and being devoid of the cooked and bitter taste characterizing products obtained by the ordinary concentration of liquid hop-flavored malt extracts to the syrupy and solid condition which comprises boiling a malt extract, adding successive batches of hops thereto to impart a hop flavor to the malt extract, cooling the hop-flavored extract thus prepared and then spray-drying the extract.

CHARLES J. KOCH.